United States Patent [19]

Sensney

[11] 3,824,340

[45] July 16, 1974

[54] VARIABLE TRANSMISSION TIME DELAY COMPENSATION ARRANGEMENT

[75] Inventor: Cleatus R. Sensney, Oakland, N.J.

[73] Assignee: International Telephone and Telegraph Corporation, Nutley, N.J.

[22] Filed: Nov. 8, 1972

[21] Appl. No.: 304,681

[52] U.S. Cl............... 178/69.5 DC, 178/5.4 SY, 178/69.5 CB, 325/4, 343/6.5 R

[51] Int. Cl............................................... H04i 7/00

[58] Field of Search........... 325/4, 8, 9; 178/5.4 SY, 178/69.5 CB, 69.5 DC; 343/6.5 R

[56] References Cited

UNITED STATES PATENTS

| | | | |
|---|---|---|---|
| 3,311,702 | 3/1967 | Legler | 178/69.5 DC |
| 3,378,837 | 4/1968 | Graves | 325/4 |
| 3,420,951 | 1/1969 | Gunther | 178/69.5 DC |
| 3,430,237 | 2/1969 | Allen | 325/4 |

*Primary Examiner*—Robert L. Griffin
*Assistant Examiner*—Jin F. Ng
*Attorney, Agent, or Firm*—John T. O'Halloran; Menotti J. Lombardi, Jr.; Alfred C. Hill

[57] ABSTRACT

This arrangement includes a variable delay circuit through which a color television signal is propagated prior to transmission to a communication satellite. The television signal is received from the satellite at the transmitting station. The color subcarrier is extracted from the received television signal and also from the original television signal. Both of the extracted color subcarriers are translated to the same frequency disposed above the frequency of the television signal. The translated subcarrier extracted from the received television signal is propagated through the delay circuit with the original television signal. At the output of the delay circuit this latter subcarrier is extracted and applied to a phase comparator for comparison with the translated subcarrier extracted from the original television signal. A control signal is produced proportional to the phase difference between the two compared translated subcarriers. The control signal controls the delay of the delay circuit to maintain the compared translated subcarriers in a predetermined phase relationship to compensate for variable transmission time delay to the satellite.

10 Claims, 1 Drawing Figure

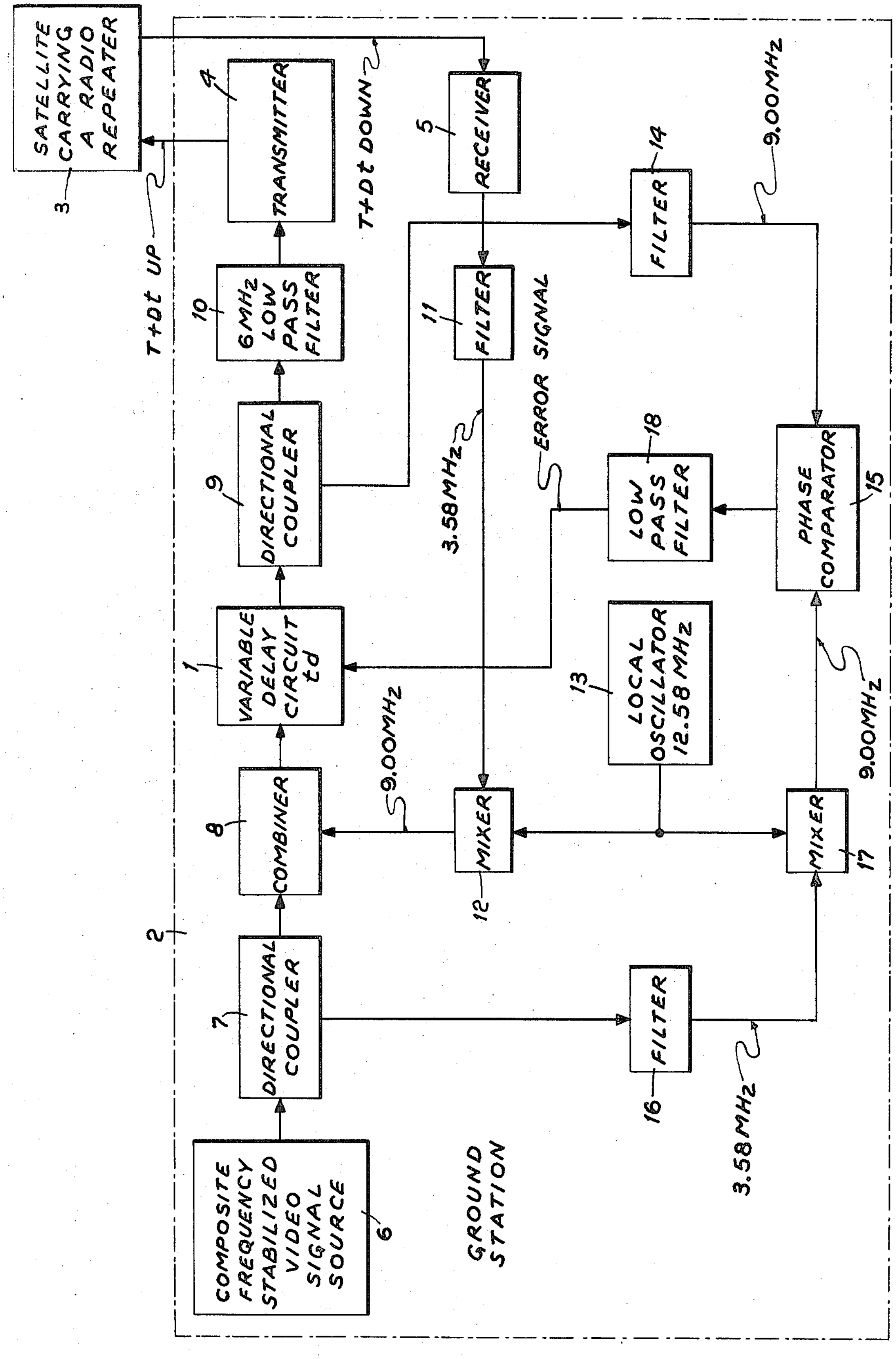
SATELLITE CARRYING A RADIO REPEATER
3
T+Δt UP
T+Δt DOWN
4
TRANSMITTER
5
RECEIVER
10
6MHz LOW PASS FILTER
11
FILTER
14
FILTER
9.00MHz
9
DIRECTIONAL COUPLER
3.58MHz
ERROR SIGNAL
18
LOW PASS FILTER
PHASE COMPARATOR
15
1
VARIABLE DELAY CIRCUIT td
13
LOCAL OSCILLATOR 12.58 MHz
9.00MHz
9.00MHz
8
COMBINER
MIXER
12
MIXER
17
2
7
DIRECTIONAL COUPLER
FILTER
16
3.58MHz
COMPOSITE FREQUENCY STABILIZED VIDEO SIGNAL SOURCE
6
GROUND STATION

VARIABLE TRANSMISSION TIME DELAY COMPENSATION ARRANGEMENT

BACKGROUND OF THE INVENTION

This invention relates to communication systems and more particularly to a variable transmission time delay compensation arrangement for a satellite communication system.

A synchronous satellite stationed over a desired point drifts over a 24 hour period with reference to a subsatellite point on earth. The satellite drifts describing a figure eight over the subsatellite point. This essentially means that there is a constant change in range between this satellite and earth stations. Therefore, if a number of earth stations geographically separated and located over a large area communicated through this satellite, each station will experience a different value of range and transmission time delay. The transmission time delay may be thought of as a fixed delay T plus a time varying delay D*t*, where T and D*t* are different for each station.

To illustrate this problem more specifically, assume there are two earth stations geographically separated transmitting color television (TV) signals through the synchronous satellite simultaneously to a TV studio. The TV studio receiving the two remote programs has a capability of switching the program that the studio is transmitting to either of the two programs being received through the satellite. The receiving TV studio, for example, desires to switch from a remote program originating from one of the earth stations to the remote program originating from the other earth stations with both of these programs being received from the satellite. In order to perform a perfect switch over, that is without a roll on the screen and without color distortion, it is necessary that the video signals, sync pulses and color subcarrier of each of the remote programs arrive at the TV studio in phase.

One of the systems presently being used for TV synchronization includes Rubidium frequency standards at each of the program originating sites. Another system also being used for TV synchronization includes a frequency stabilizing phase locked loop referred at times as a Gen-lock system. The current procedure employed to ensure that the two remote programs are received in phase at the TV studio is to measure the phase difference between the two received programs and to telephone either originating station requesting the local technician to increment or decrement his frequency standard until the two received signals are in phase. In this manner fixed, non-varying time delays are calibrated out. In addition, the TV sync pulses are derived from 3.58 megahertz (MHZ) color subcarrier which in turn is derived from the frequency standard. Therefore, if the color subcarriers of the two received signals are in phase, the sync pulses of the two received signals are automatically maintained in phase.

One of the disadvantages of the procedure outlined hereinabove to maintain two receive TV signals in phase is manual adjustment of the frequency standard of at least one of the originating stations and in addition the need for employing a telephone communication link between the studio and both of the originating stations.

SUMMARY OF THE INVENTION

An object of the present invention is to provide an automatic arrangement for ensuring that variable transmission time delay is compensated for so that two remotely originating signals passing through a communication satellite will be received at a common receiving point in phase.

Another object of the present invention is to provide an automatic variable transmission time delay compensation arrangement which will enable a TV studio to freely switch between two remote programs due to their inphase relationship as the result of the compensation arrangement regardless of their originating point without degrading the system.

A feature of the present invention is the provision of a variable transmission time delay compensation arrangement for a satellite communication system comprising: a satellite; a source of composite signal including therein a signal component having a given frequency; a variable delay circuit; first means to couple the source to the delay circuit to enable the composite signal to propagate therethrough; second means coupled to the output of the delay circuit to transmit the composite signal to the satellite; third means to receive the composite signal from the satellite; fourth means coupled to the third means to extract a first of the signal component from the received composite signal; fifth means coupled to the source to extract a second of the signal component from the composite signal; sixth means coupled to the fourth means and the fifth means to translate the given frequency of both the first of the signal component and the second of the signal component to a predetermined frequency disposed above the composite signal; seventh means coupled to the sixth means and the first means to enable the first of the signal component having the predetermined frequency to propagate through the delay circuit along with the composite signal; eighth means coupled to the output of the delay circuit to pass only the first of the signal component having the predetermined frequency; ninth means coupled to the output of the eighth means and the sixth means to compare the phase of the second of the signal component having the predetermined frequency with the phase of the first of the signal component having the predetermined frequency and to produce a control signal proportional to the phase difference between the compared signal components; and tenth means to couple the control signal to the delay circuit to maintain the compared signal components in a predetermined phase relationship to compensate for variable transmission time delay to the satellite.

BRIEF DESCRIPTION OF THE DRAWING

The above-mentioned and other features and objects of this invention and the manner of obtaining them will become more apparent by reference to the following description taken in conjunction with the drawing, the single FIGURE of which is a block diagram of a variable transmission time delay compensation arrangement in accordance with the principles of the present invention.

DESCRIPTION OF THE PREFERRED EMBODIMENT

The present invention presents a solution to the problem of having two remote TV signals propagated through a single satellite arrive in phase at a TV station that does not require control over the time and frequency standard of the TV station where the program is originated. However, the scheme presented here will compensate for time varying delay and phase in each case and will enable the TV networks to continue using their present frequency standard system, such as Rubidium and Gen-lock systems.

The solution presented herein assumes that the 3.58 MHZ color subcarrier of a remotely generated video signal transmitted over a satellite link is referenced to either of the above-mentioned frequency standards. In order to enable a TV studio to switch between programs remotely generated, without rolling, it is mandatory that the time delay from these remote originating stations to the satellite be constant and identical since the two remote signals follow two different paths of different time delay and range. The time delay from the satellite to the common studio is constant for both signals since the signals follow the same path. With reference to the FIGURE the time delay (T + D*t*) plus the time delay *td* of delay circuit 1 of each remote station should always remain a constant number, for instance, 140,000 microseconds. Since T is constant, and does not vary, (*td* + D*t*) is the quantity which varies and must be held to a constant number, typically, 103–110 microseconds. This quantity (*td* + D*t*) is held constant by varying the delay *td* of delay circuit 1 which is controlled by the error voltage generated in a phased locked loop associated therewith.

Referring to the FIGURE variable delay circuit 1 is included in a ground station 2 which is in communication with a satellite 3 by means of transmitter 4 and receiver 5. The variable transmission time delay compensation arrangement of the present invention includes variable delay circuit 1 coupled to a composite frequency stabilized video signal source 6 through means of directional coupler 7 and combiner 8. The composite signal at the output of source 6 includes the video, sync pulses and color subcarrier. This composite signal passes through variable delay circuit 1 to directional coupler 9 the output signal of which is presented to transmitter 4 through means of a 6 MHZ low pass filter 10. The composite signal is then operated upon by transmitter 4 for transmission to satellite 3 which includes therein a radio repeater which will propagate the output of transmitter 4 to a receiving TV studio (not illustrated) and also back to ground station 2 for reception by receiver 5. The output signal of receiver 5 is filtered by filter 11 so as to pass only the 3.58 MHZ color subcarrier. The output signal of filter 11 is coupled to mixer 12 which receives a local oscillator signal from local oscillator 13 to translate the frequency of the color subcarrier at the output of filter 11 to a value of frequency above the frequency of the composite color TV signal, such as 9.00 MHZ, so that the output signal of mixer 12 may be applied to combiner 8 wherein it is frequency multiplexed with the original composite video signal and propagated through delay circuit 1. To achieve the 9.00 MHZ output signal of mixer 12, local oscillator 13 generates a frequency having a value equal to 12.58 MHZ and mixer 12 includes therein appropriate circuitry to select the difference frequency between the frequency of the output signal of filter 11 and the frequency of the output signal of oscillator 13.

The 9.00 MHZ color subcarrier applied to combiner 8 and passed through delay circuit 1 is not transmitted again but rather is coupled to filter 14 by directional coupler 9 with filter 14 passing only the 9.00 MHZ color subcarrier to one input of phase comparator 15. The reference signal for phase comparator 15 is provided by extracting the 3.58 MHZ subcarrier at the output of source 6 by means of directional coupler 7 and filter 16 with filter 16 passing only the 3.58 MHZ color subcarrier. The output signal of filter 16 is coupled to mixer 17 which receives the output signal from oscillator 13 to perform a frequency translation of the 3.58 MHZ color subcarrier to a 9.00 MHZ color subcarrier as was accomplished in mixer 12. The output signal of mixer 17 is applied to the other input of phase comparator 15. The frequency translation of the two color subcarrier signals, one extracted from the composite signal received from the satellite 3 and the other extracted from the original composite signal at the output of source 6, to the same frequency above the frequency of the composite TV signal is accomplished by a common local oscillator signal to provide phase stability for the two resulting signals.

Phase comparator 15 compares the output signal of filter 14 with the output signal of mixer 17 and produces a control or error signal proportional to the phase difference between the two frequency translated subcarrier signals applied to the two inputs of phase comparator 15. The resultant control signal is passed through low pass filter 18 to the control input of delay circuit 1 to adjust the delay of delay circuit 1 so as to maintain a 90° phase relationship between the frequency translated subcarrier of the original signal at the output of source 6 and the delay corrected frequency translated received subcarrier signal at the output of filter 14. The variable transmission time delay to the satellite 3 is compensated for when the above mentioned 90° phase relationship is maintained.

When the above described variable transmission time delay compensating arrangement is employed in each station originating a remote TV program for transmission through a common communication satellite to a common TV studio, the variable transmission time delay to the satellite for each station will be compensated for and, thus, the signal path from each remote station to the satellite will effectively have the same transmission time delay. Therefore, the TV programs from each of the remote stations will be received from the common satellite at the common TV studio in phase with respect to each other.

While I have described above the principles of my invention in connection with specific apparatus it is to be clearly understood that this description is made only by way of example and not as a limitation to the scope of my invention as set forth in the objects thereof and in the accompanying claims.

I claim:

1. A variable transmission time delay compensation arrangement for a satellite communication system comprising:
- a satellite;
- a source of composite signal including therein a signal component having a given frequency;
- a variable delay circuit;
- first means to couple said source to said delay circuit to enable said composite signal to propagate therethrough;
- second means coupled to the output of said delay circuit to transmit said composite signal to said satellite;

third means to receive said composite signal from said satellite;

fourth means coupled to said third means to extract a first of said signal component from said received composite signal;

fifth means coupled to said source to extract a second of said signal component from said composite signal;

sixth means coupled to said fourth means and said fifth means to translate said given frequency of both said first of said signal component and said second of said signal component to a predetermined frequency disposed above said composite signal;

seventh means coupled to said sixth means and said first means to enable said first of said signal component having said predetermined frequency to propagate through said delay circuit along with said composite signal;

eighth means coupled to the output of said delay circuit to pass only said first of said signal component having said predetermined frequency;

ninth means coupled to the output of said eighth means and said sixth means to compare the phase of said second of said signal component having said predetermined frequency with the phase of said first of said signal component having said predetermined frequency and to produce a control signal proportional to the phase difference between said compared signal components; and 10th means to couple said control signal to said delay circuit to maintain said compared signal components in a predetermined phase relationship to compensate for variable transmission time delay to said satellite.

2. An arrangement according to claim 1, wherein said first means includes a combiner to combine said composite signal and said first of said signal component having said predetermined frequency on a frequency basis.

3. An arrangement according to claim 1, wherein said fourth and fifth means each include a filter to pass only said signal component having said given frequency.

4. An arrangement according to claim 1, wherein said sixth means includes a first mixer coupled to said fourth means, a second mixer coupled to said fifth means, and a local oscillator coupled in common to said first and second mixers, said local oscillator generating an output signal having a frequency equal to said given frequency plus said predetermined frequency.

5. An arrangement according to claim 1, wherein said seventh means includes a conductor directly coupled between said sixth means and said first means.

6. An arrangement according to claim 1, wherein said eighth means includes a filter coupled to the output of said delay circuit to pass only said first of said signal component having said predetermined frequency.

7. An arrangement according to claim 1, wherein said ninth means includes a phase comparator coupled to said sixth means and said eighth means.

8. An arrangement to claim 1, wherein said 10th means includes a low pass filter coupled between said ninth means and said delay circuit.

9. An arrangement according to claim 1, wherein said composite signal is a color television signal; and said signal component is a frequency stabilized color subcarrier of said color television signal.

10. An arrangement according to claim 1, wherein said fourth means includes a first filter having its input coupled to the output of said third means to pass only said first of said signal component having said given frequency;

said fifth means includes a second filter having its input coupled to the output of said source to pass only said second of said signal component having said given frequency;

said sixth means includes a first mixer having one of its inputs coupled to the output of said first filter, a second mixer having one of its inputs coupled to the output of said second filter, a local oscillator having its output coupled in common to the other input of said first mixer and the other input of said second mixer, said local oscillator generating an output signal having a frequency equal to said given frequency plus said predetermined frequency;

said seventh means includes a conductor coupled to the output of said first mixer;

said first means includes a combiner having one input coupled to said source, a second input coupled to said conductor and an output coupled to the input of said delay circuit, said combiner combining said composite signal and said first of said signal component having said predetermined frequency on a frequency basis for application to said input of said delay circuit;

said eighth means includes a third filter having its input coupled to the output of said delay circuit to pass only said first of said signal component having said predetermined frequency;

said ninth means includes a phase comparator having one input coupled to the output of said second filter and a second input coupled to the output of said third filter; and said 10th means includes a low pass filter coupled between the output of said phase comparator and a control input of said delay circuit.

* * * * *